United States Patent [19]
Burr et al.

[11] 3,834,014
[45] Sept. 10, 1974

[54] METHOD OF MAKING LAMINATED WIRE WOUND/ARMATURES

[75] Inventors: Robert Page Burr; Raymond J. Keogh, both of Huntington, N.Y.

[73] Assignee: Photocircuits Corporation, Glen Cove, N.Y.

[22] Filed: May 8, 1972

[21] Appl. No.: 122,166

Related U.S. Application Data
[62] Division of Ser. No. 831,556, June 9, 1969, Pat. No. 3,599,325.

[52] U.S. Cl. ................... 29/598, 29/605, 310/43, 310/268
[51] Int. Cl. ................................. H02k 15/02
[58] Field of Search ............ 29/596, 597, 598, 605; 310/268, 43

[56] References Cited
UNITED STATES PATENTS
229,191  6/1880  Seeley ................................ 310/268

3,524,251  8/1970  Burr ..................................... 29/598

FOREIGN PATENTS OR APPLICATIONS
673,793  6/1952  Great Britain ....................... 29/598

Primary Examiner—Charles W. Lanham
Assistant Examiner—Carl E. Hall

[57] ABSTRACT

A method of making self-supporting wire wound disc armatures by laminating the radial conductor portion of the armature and by coupling the winding to the commutator and hub by means of a laminate layer. The sequence of operations is arranged so that commutator connections can conveniently be made by hot staking and the commutator can be formed from a thin sheet metal blank.

3 Claims, 13 Drawing Figures

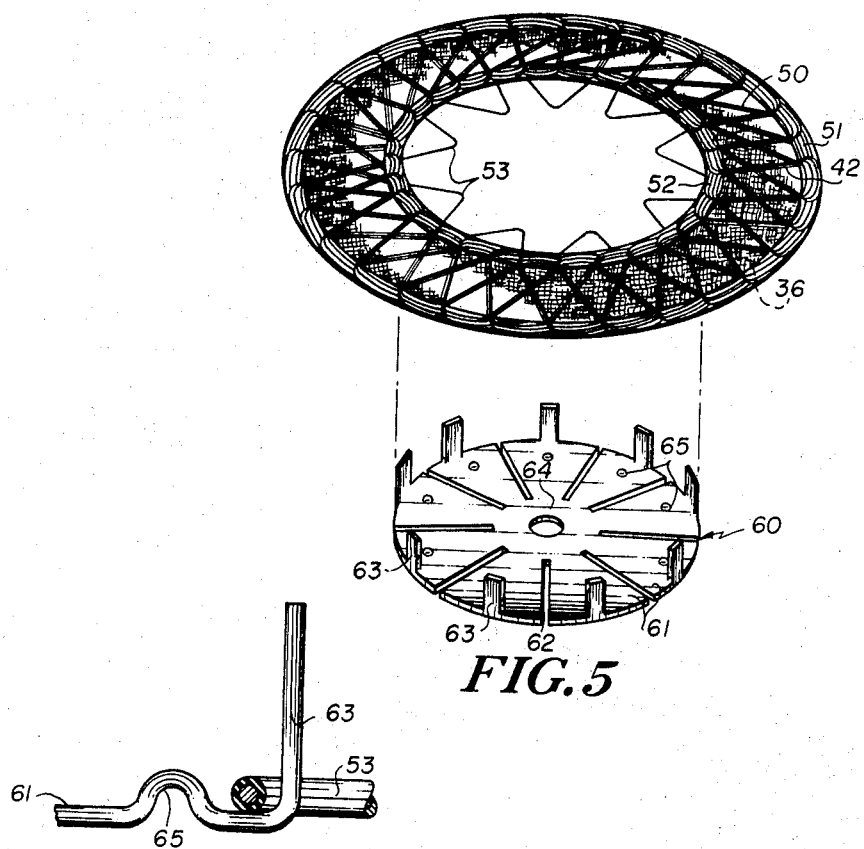
FIG.5
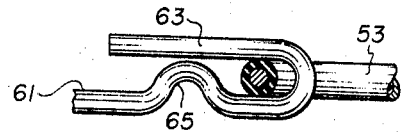
FIG.6A
FIG.6B
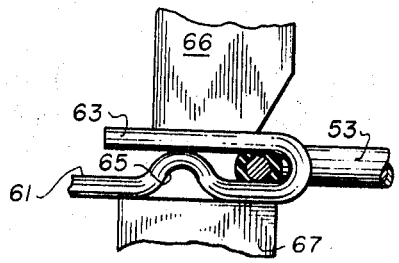
FIG.6C
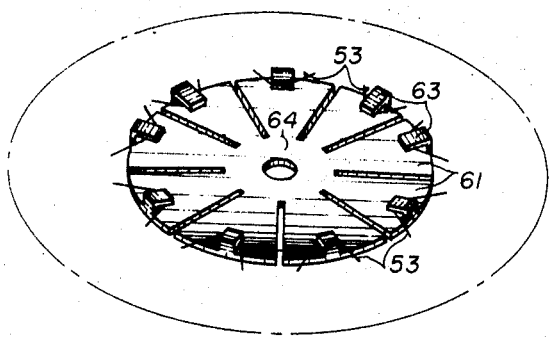
FIG.6D

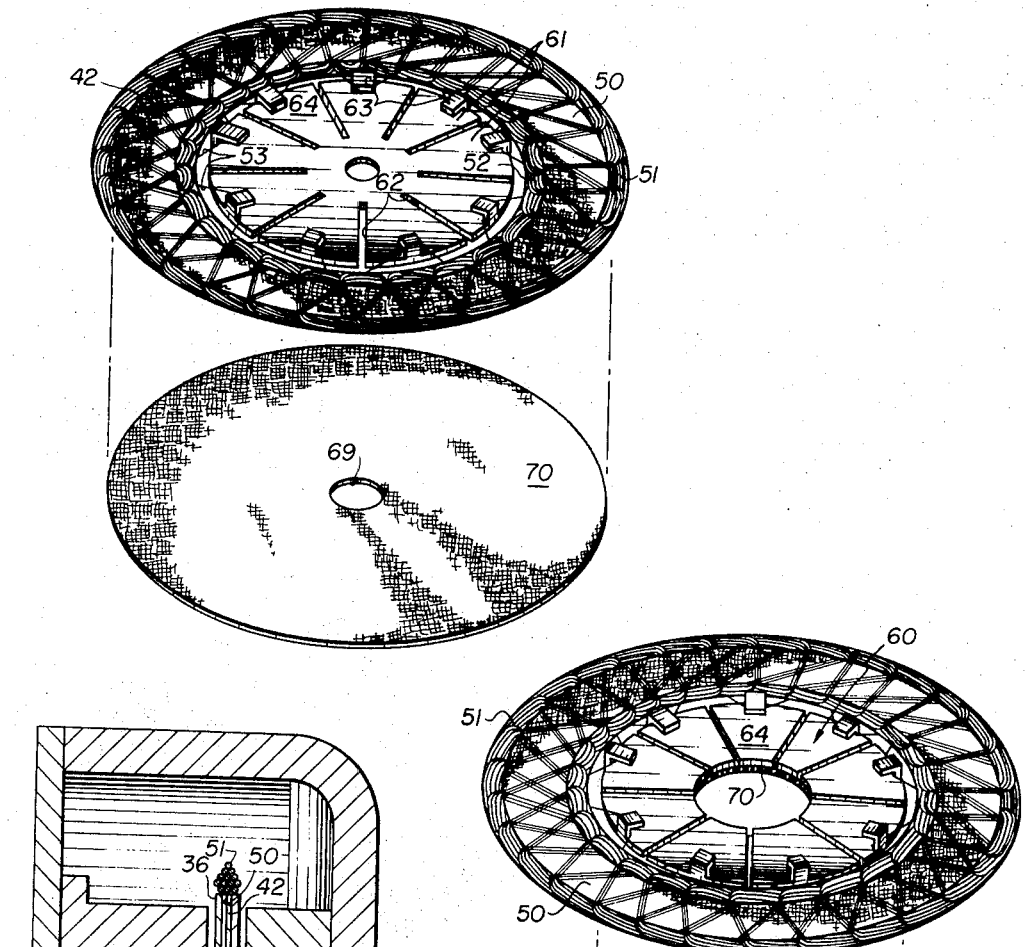
FIG. 7
FIG. 8
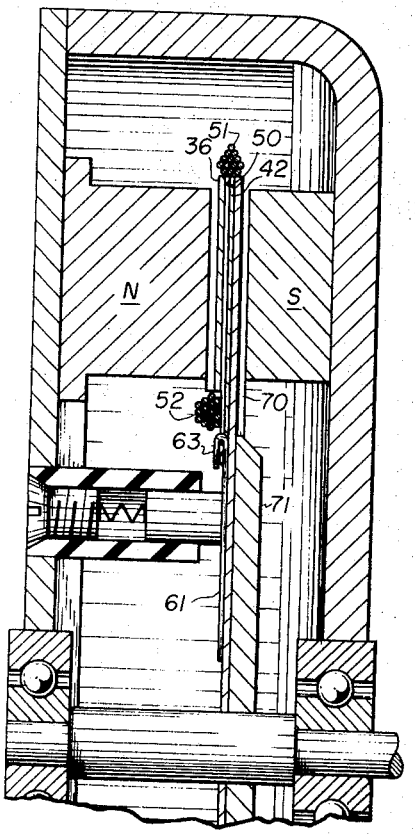
FIG. 9

METHOD OF MAKING LAMINATED WIRE WOUND/ARMATURES

CROSS REFERENCES TO RELATED APPLICATIONS

This application is a division of U.S. application Ser. No. 831,556, filed June 9, 1969, now U.S. Pat. No. 3,599,329, dated Aug. 17, 1971, contains subject matter in part common to the following copending applications: Serial No. 511,608, filed Dec. 6, 1965 in the name of Robert Page Burr and entitled *Disc Type Wire Wound Electrical Machines;* Ser. No. 511,709, filed Dec. 6, 1965 in the name of Robert Page Burr and entitled *Electrical Wire Wound Machines;* 736,873, filed Apr. 8, 1968 in the name of Robert Page Burr and entitled *Disc Type Wire Wound Electrical Machines;* Ser. No. 739,577, Filed Apr. 8, 1968 in the name of Robert Page Burr and enitled *Electrical Wire Wound machines:* Ser. No. 620,306, filed Mar. 3, 1967 in the name of Raymond J. Keogh and entitled *Wire Wound Armature, Method and Apparatus for Making Same;* Ser. No. 798,497, filed Oct. 3, 1969, now U.S. Pat. No. 3,534,469, dated Oct. 20, 1970 and entitled *Winding for Disc-Type DC Machine Armatures;* Ser. No. 798,496, filed Oct. 3, 1969 and entitled *Winding for Disc-Type DC Machine Armatures.*

BACKGROUND OF THE INVENTION

This invention relates to wire wound disc armatures as well as methods and apparatus for making the same and motors embodying the same.

Disc armatures made from metal bar conductors or insulated wire conductors were first disclosed in the 1880's. For example, see Seeley, Pat. No. 229,191 issued in 1880, Frick, Pat. No. 295,534 issued in 1884, Ball, Pat. No. 294,719 issued in 1884, Horry, Pat. No. 306,687 issued in 1884, Jehl, Pat. No. 376,307 issued in 1888, Firtsche, Pat. No. 386,775 issued in 1888 and Desroziers, Pat. No. 459,610 issued in 1891. However, motors with cylindrical armatures were easier to produce and had certain other natural advantages. As a result, the disc motor did not emerge as a successful commercial product until the 1960's. These disc motors included printed circuit armatures such as disclosed in Henry-Baudot, Pat. 3,144,574 issued Aug. 11, 1964 and Burr, Pat. 3,171,051 issued Feb. 23, 1965 or disc armatures made using stamping techniques such as disclosed in Knapp et al., Pat. No. 3,382,570 issued May 14, 1968. The disc motors to date have been successful mostly in high performance servo applications.

Th wire wound disc armature, although potentially less expensive because of more efficient use of copper and potentially more flexible because of fewer design restrictions, has proven to be difficult to reduce to an effective commercial product. The above-mentioned copending applications, among other things, disclose a unique disc wire wound armature structure and a technique for making the same by, in effect, writing with wire. In other words, a wire dispensing stylus is used to lay down the desired winding pattern upon a flat surface and therafter the conductor positions are fixed to form a self-supporting disc armature. The copending applications also disclose certain unique winding patterns and integrated motor structures. This application embodies subject matter in part common to the above-mentioned prior copending applications and, in addition, discloses a unique technique for forming the self-supporting armature, as well as a unique armature structure and integratd motor embodying the same.

BRIEF DISCRIPTION OF THE DRAWINGS

The following detailed specification sets forth an illustrative embodiment and includes the drawings which form part of the specification and wherein:

FIGS. 2-8 are perspective assembly drawings illustrating successive steps in a wire wound disc armature assembly;

FIG. 9 is a partial cross sectional view of a completed motor; and

GENERAL DESCRIPTION AND SUMMARY OF INVENTION

Figure 1:
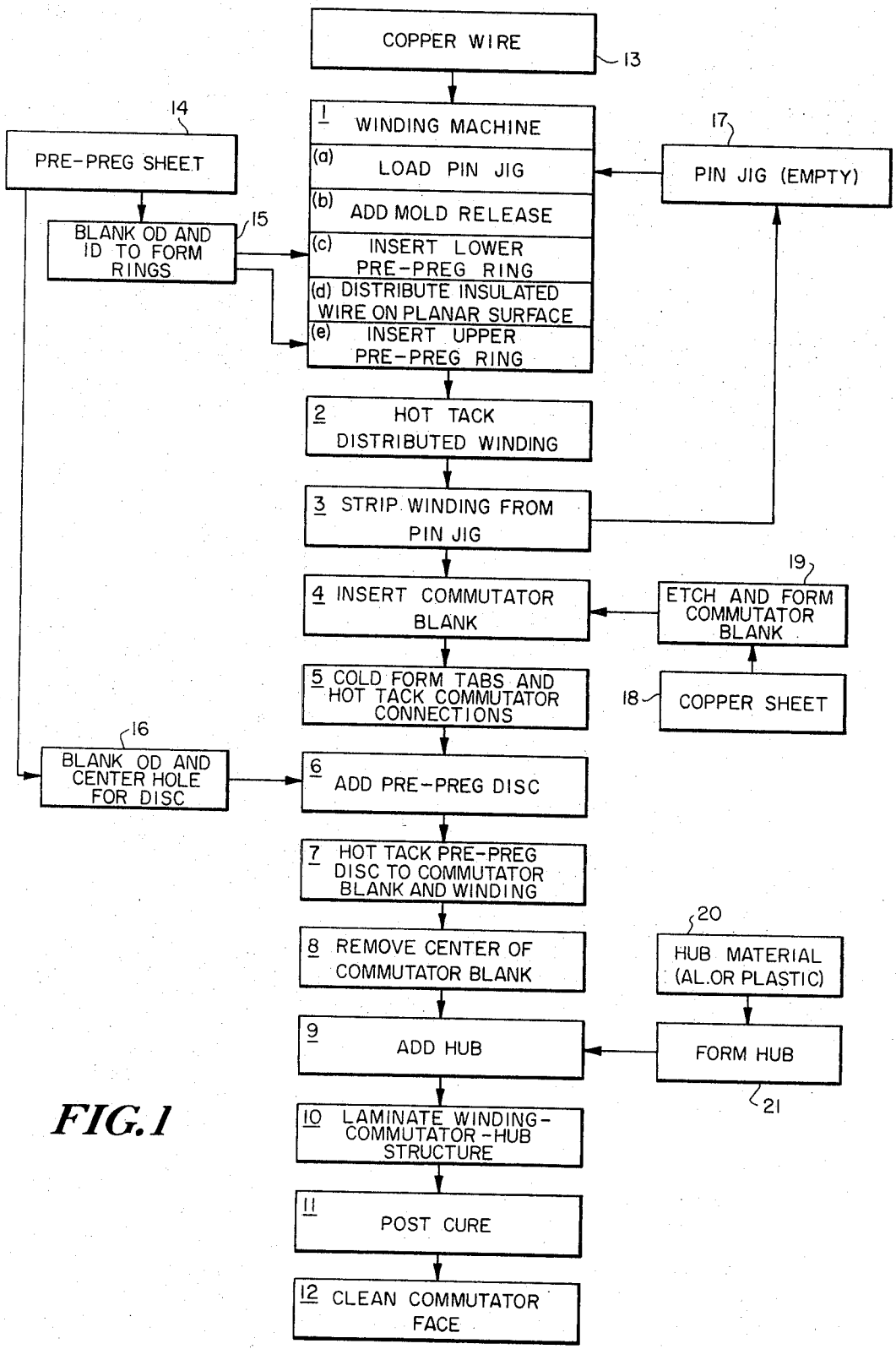
FIG. 1 is a flow diagram illustrating a method for making a wire wound disc armature.

The armature, according to the invention, includes the distributed insulated wire winding with successive radial segments of the winding spaced approximately according to the distance between adjacent pole centers of the stator, these radial segments being interconnected by cross-over connections adjacent to the air gap area which lies within the magnetic field of the motor. The armature structure is laminated within the air gap region to fix the positions of the radial conductor segments. The winding is connected to commutator segments at periodic connection points uniformly distributed throughout the winding, this being achieved by mean of commutator pullouts made as part of the initial insulated wire pattern.

A hub structure is located behind the commutator and provides structural support which absorbs the forces of the brushes bearing upon the relatively thin commutator structure. A lamination layer extends from the air gap area of the winding inwardly so that it is also located between the commutator and the hub to physically bond these elements while, at the same time, insulating one from the other. This laminated layer also serves to secure the winding to the hub and commutator. The laminating layer is preferably of a cloth-like material which can be fiber glass impregnated with a resin which serves to bond the various structural elements. This layer thus is effective to physically interconnect the elements, to transmit torque to and from the winding, to electrically insulate the commutator from other elements and to physically hold the individual commutator segments in the desired positions.

The laminated armature structure is mounted on a motor shaft and the armature is located within the magnetic field provided by a suitable permanent magnet arrangement providing alternating magnetic polarities. The stator structure also includes brush holders for maintaining the brushes in their proper positions bearing against the commutator segments.

The technique for making the armature starts with the dispensing of insulated wire upon a ring of resin impregnated cloth-like (pre-preg) material. The inside and outside diameters of the ring correspond approximately to the inner and outer diameters of the air gap region of the finished motor. The prepreg ring is located on a flat surface which is part of a pin jig. The winding is formed by positioning the insulated wire around the positioning pins of a pin jig to form the successive radial segments, cross-over connections and commutator pullouts. This is achieved through a co-ordinated motion of a reciprocating wire-dispensing stylus and rotation of the pin jig. After the winding has been formed, a second pre-preg ring is located above the winding. Heat and pressure are then applied sufficient to at least temporarily fix the conductor pattern. As a result, the winding can be removed from the pin jig and is sufficiently stable to permit further operations.

The commutator structure can now be attached to the winding. Initially, the commutator structure is in the form of a relatively thin copper disc scored to support the individual commutator segments but to, at the same time, leave each of these segments connected to a common center ring. Individual tabs extending from outer ends of the commutator are passed through the commutator pullout leads and the tabs are then cold formed around the insulated wire conductors. The pre-preg rings are restricted to the air gap region of the armature and do not extend into the area occupied by the commutator and, therefore, both sides of the commutator segments are exposed. This permits interconnection of the commutator pullouts and the commutator segments by hot staking which requires that electrodes engage the copper surfaces on opposite sides of the conductor, i.e., one electrode against a surface of the commutator segment and the other electrode against the tab on the opposite side. When the electrodes are energized, heat is generated by current flow through the conductive path between the electrodes. Sufficient heat is generated to melt the insulation surrounding the conductor and to provide a fusion weld. After the commutator structure is electrically connected to the winding, a physical interconnection is made, at least temporarily, by means of a pre-preg disc. This disc not only couples the commutator to the winding but also holds the individual commutator segments in the desired positions relative to one and other. The center of the commutator structure can, therefore, be blanked out to electrically separate the individual commutator segments.

Thereafter, the hub is located behind the commutator segments and heat and pressure are applied so the resin of the pre-preg layers will flow to form a laminated armature structure including the winding, the commutator and the hub.

DETAILED DESCRIPTION OF PROCESS FOR FORMING THE ARMATURE

The process for forming the armature is illustrated in FIG. 1 which is a flow diagram. The basic on-line steps of the process are the main assembly line sequence and are indicated in the boxes extending through the center of the drawing running from top to bottom. The remaining blocks in FIG. 1 indicate the supply of raw materials at the appropriate points in the process and off-line operations which are necessary to form components for the on-line operations. Many of the operations are illustrated in assembly diagrams FIGS. 2 through 8.

The first step, as indicated in FIG. 1, involves the formation of the insulated wire armature pattern on a wire winding machine more fully described in co-pending application, Ser. No. 814,421, entitled *MACHINE FOR MAKING WIRE WOUND ARMATURES*, filed Apr. 8, 1969 in the name of Robert P. Burr. The formation of the winding comprises five sub-steps designated (*a*) to (*e*), respectively, in FIG. 1.

Figure 2:
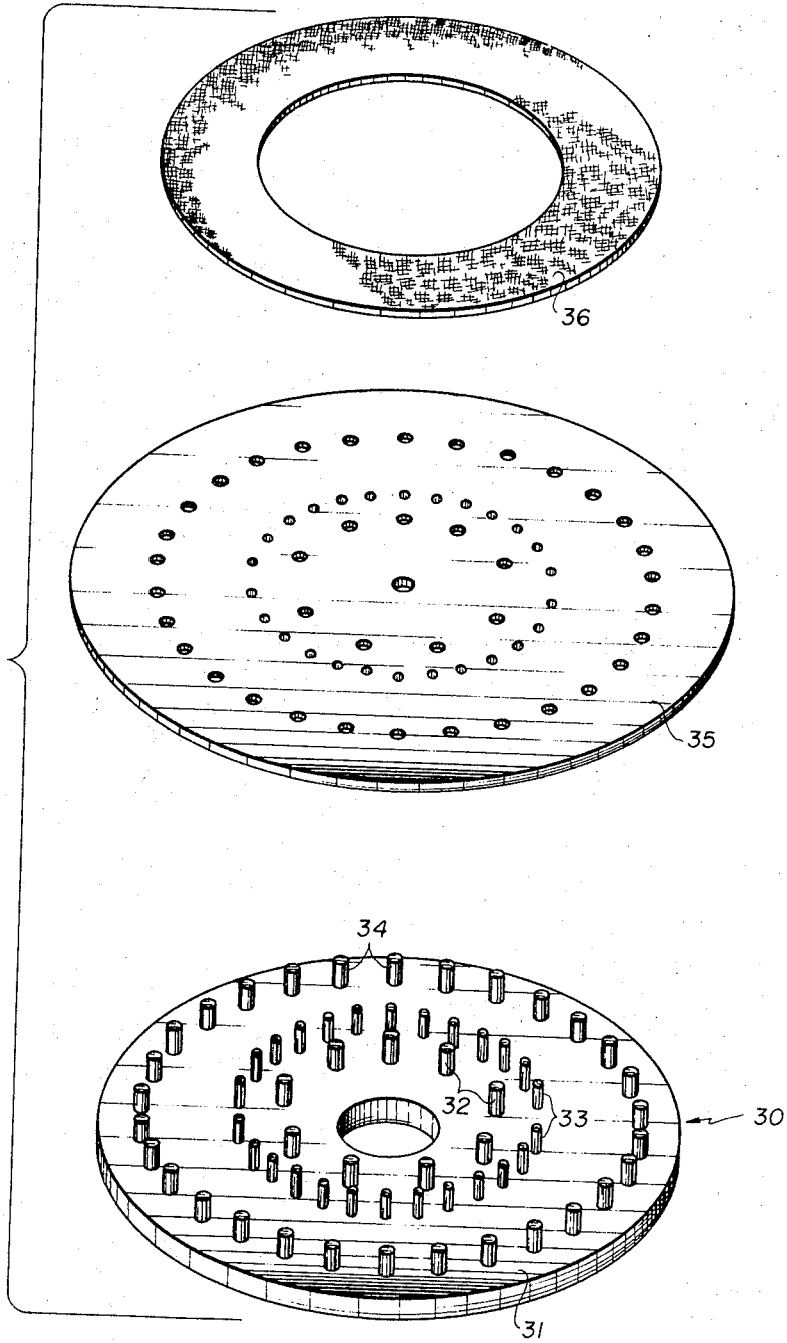

The pin jig 30, shown in FIG. 2, is a removable portion of the wire winding machine and consists of a base plate 31 with three concentric rows 32, 33 and 34, of positioning pins extending upwardly therefrom. The locations of the concentric rows and the number of pins in each of the rows depends upon the desired size and characteristics of the armature as is more fully described in co-pending application Ser. No. 620,306 filed Mar. 3, 1967 in the name of Raymond J. Keogh, entitled *WIRE WOUND ARMATURE, METHOD AND APPARATUS FOR MAKING SAME*.

A cooperating stripper blade 35 includes three circular arrays of holes located in accordance with the locations of the positioning pins of the associated pin jig. The armature winding is formed upon the stripper blade around the portions of the positioning pins extending above the stripper blade. When complete, the winding is removed by simply lifting the stripper plate from the pin jig. The first sub-step in the process, step 1(*a*), is to load the pin jig into the wire winding machine and to position the stripper blade upon the pin jig. A mold release material, such as a silicone rubber, is spread upon the upper surface of the stripper blade.

The next sub-step, step 1(*c*), is to place a pre-preg ring 36 upon the stripper plate. As indicated at 14 in FIG. 1, the pre-preg ring is made from a sheet of pre-preg material which can consist of a base material such as paper, glass cloth or glass mat impregnated or coated with thermosetting resins such as epoxy, phenolic or polyester resins. The resin is partially cured to what is called a "B" stage by driving off the volitiles in a drying oven. The partially polymerized or semi-cured material is dry and tack-free and is commonly referred to as "pre-preg." Glass cloth is preferable because of its strength but non-woven base materials can be used where cost becomes a factor. The thermosetting resin is preferably of the fast curing type to minimize assembly line delays. Resins should be selected having relatively high temperature characteristics so that the completed product is capable of withstanding the normal temperature rise likely to exist in the motor. Pre-preg ring 36 is blanked out of the sheet material, and the inner diameter is likewise blanked out to form the ring, as indicated in sub-assembly step 15. The inner and outer diameters of the ring are selected so that the ring fits between the positioning pins in rows 33 and 34 of the pin jig.

Figure 3:
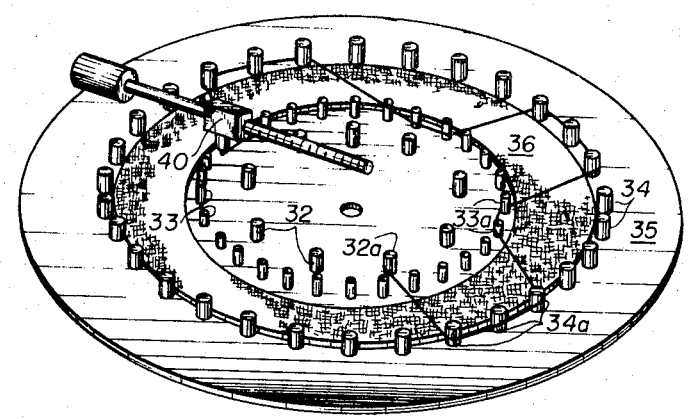

Afte pre-preg ring 36 has been placed upon the stripper plate, the insulated wire armature pattern is formed, as shown in FIG. 3. The wire dispensing stylus 40 is controlled so that it reciprocates in a motion coordinated with the rotation of the pin jig. The wire is attached to one of the inner positioning pins 32*a* and then, as the stylus moves outwardly, a first generally radial conductor is formed. Thereafter, as the pin jig rotates, an outer cross-over connection is formed around pins 34*a*; as the stylus moves inwardly a second generally radial conductor is formed; as the pin jig further rotates an inner cross-over connection is formed around positioning pins 33*a*, etc. Periodically, the pin jig is indexed so that the winding pattern will be developed around successive sets of positioning pins and the winding will uniformly cover the entire surface. Also, at selected, uniformly spaced intervals the stroke of the stylus is lengthened so that the wire passes around the inner positioning pins to thereby form the commutator pullouts. The winding continues until returning to the starting point thereby completing the closed armature winding.

Figure 4:
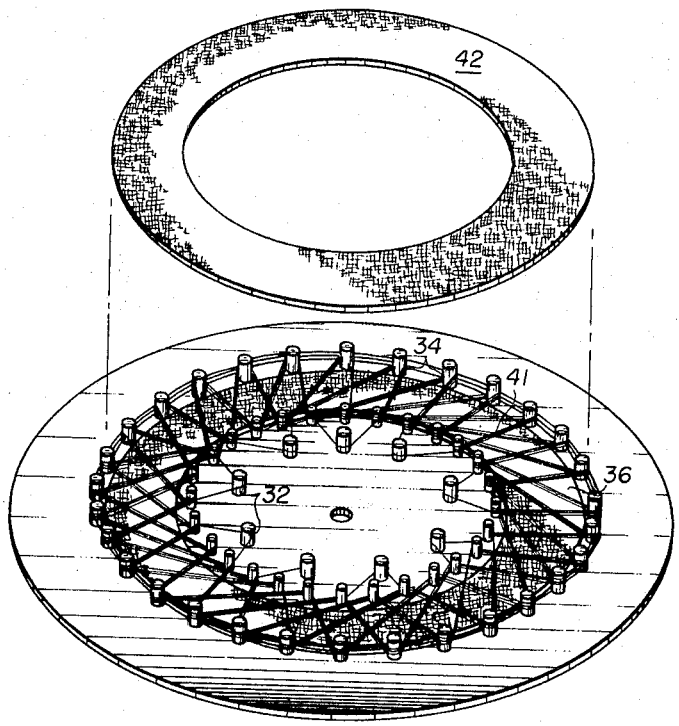

An upper pre-preg ring 42 is placed above the winding pattern, as indicated in Step 1e and shown in FIG. 4. Ring 42 is the same as the lower pre-preg ring 36. At this point, the operations to be performed on the winding machine are completed and, therefore, the pin jig carrying the winding pattern can be removed.

Step 2 of the process is to hot tack the winding pattern so that it can be removed from the pin jig and so that subsequent operations can be performed without destroying the winding configuration. To achieve this, the pin jig carrying the winding and pre-preg rings 36 and 42 is inserted into a hot tacking press which applies heat and pressure sufficient to obtain at least a temporary low-strength adhesion between the rings and the winding pattern.

A satisfactory hot tack can be achieved by using a heated platten having a relatively large mass to minimize temperature drop. The temperature of the platten is governed by the characteristics of the thermosetting resin, and the pressure and duration of application depend upon the number of conductors of the winding pattern as well as the characteristics of the resin. Generally, best results are achieved by rapidly moving the platten into and out of engagement with the pre-preg rings. Care must be taken to avoid destroying the laminating characteristics of the pre-preg material.

When the hot tack is completed, the next step is to strip the winding from the pin jig which is accomplished by raising the stripper plate. The winding is easily removed, particularly since mold release has been applied to the stripper blade to eliminate any significant adhesion between the lower pre-preg ring 36 and the stripper blade. The pin jig has completed its function and can now be reloaded into the winding machine for the formation of the next winding.

The armature at this stage is as shown in FIG. 5 including generally radial conductor segments 50, outer cross-over connections 51, inner cross-over connections 52 and regularly spaced commutator pullouts 53 along the inner periphery of the annular winding. The pre-preg rings 36 and 42 are located in the region bounded by the inner and outer cross-over connections 51 and 52.

The next step, step 4, is to insert the commutator blank 60 as illustrated in FIG. 5. The commutator blank is formed in off-line operation 19 (FIG. 1) and is made from relatively thin copper sheet material which is scored either by etching or stamping to provide the separations 62 between the individual commutator segments 61. The inner edges of the commutator segments are not separated from the center portion 64 of the blank so that the commutator blank can be handled as a unit rather than as individual segments. Tabs 63 extend upwardly from the outer edges of the commutator segments. The blank is moved upwardly, as indicated in FIG. 5, so that the tabs 63 pass through the respective commutator pullout loops 53.

The next step, Step 5, is to cold form the tabs and to electrically interconnect the commutator pullouts and the commutator segments by hot staking. This operation is illustrated in FIGS. 6A–D.

When the commutator blank is placed in position, the tab 63 of a commutator segment 61 extends upwardly through the commutator pullout loop 53, as shown in FIG. 6A. Tab 63 is then bent inwardly so that it surrounds a portion of the insulated commutator pullout loop 53. A dimple 65 is located inwardly from the tab and provides for engagement between the main body of the commutator segment and the tab in the region inwardly of the insulated conductor.

Next, the hot staking operation is performed. A tungston electrode 66 is brought downward into engagement with tab 63 and a beryllium-copper alloy electrode 67 is brought into engagement with the lower commutator segment surface. There are two conductive paths between the electrodes, one passing outwardly through the curved portion of tab 63 and the other passing through dimple 65 to reach the tab 63. The current flow through these conductive paths generates sufficient heat to melt the heat soluble insulation around the conductor and establish a fusion weld between the conductor and the commutator segments. Generally, the best hot staking results are achieved by applying maximum energy in the shortest possible time since this minimizes undesirable heat flow away from the commutator into other portions of the structure. Factors affecting the energy requirements are the thickness of the commutator, the size of the tabs, the wire size and the type of insulation. Satisfactory results can be achieved by energization for a period of approximately 50 milliseconds.

After completion of the hot staking operation, the armature with the commutator blank physically and electrically connected appears generally as shown in FIG. 6D.

In off-line operation 16 (FIG.1) a disc 70 is blanked from a sheet of pre-preg material similar to that used in making rings 36 and 42. The outer diameter of the disc is the same as the outer diameter of rings 36 and 42. An alignment hole 69 is located in the center of the disc. As indicated in step 6 and as shown in FIG. 7, the pre-preg disc is located on the side of the commutator opposite tabs 63. In step 7 sufficient heat and pressure are applied by means of a heated platten to hot tack disc 70 in place.

Disc 70 not only physically interconnects the commutator and the winding, but also serves to hold the individual commutator segments 61 in their proper locations. It is therefore possible to blank out the center of the commutator to electrically separate the commutator segments as is indicated in step 8. The armature as it appears after the blanking operation is shown in FIG. 8.

A hub 71 is formed in off-line operation 21 and has a generally disc shape with a bevel on the outer periphery and a hole in the center, the diameter of the center hole being less than the center diameter of the commutator after the blanking operation. The outer diameter of the hub is approximately the same as the outer diameter of the commutator so that the hub can back up the thin copper commutator and provide the necessary support for absorbing brush forces against the commutator. The hub can be made from any suitable material such as aluminum or, where cost is a critical factor, from a suitable plastic material. The hub is electrically separated from the commutator by pre-preg disc 70.

The structure is next placed in a laminating press where sufficient heat and pressure and applied to achieve a proper flow of the resins which will securely interconnect the conductors and which will bond the commutator segments to the hub and the winding. In the region between the inner and outer cross-over connections it is important that the structure be a thin and flat as possible since it is this portion of the armature which is located within the air gap of the motor. After the armature is removed from the laminating press, it is placed in an oven which maintains a suitable temperature for post-curing of the resin, as indicated in step 11.

Finally, the commutator is cleaned and smoothed to provide a brush track. This can be achieved by a simple sanding operation, or, in the better quality motors, by a suitable machining operation.

The pre-preg sheet material from which rings 36 and 42 and disc 70 are made must be carefully selected since relatively large voids exist in the winding and because the winding thickness across which the resins must flow is considerable. Accordingly, the pre-preg material should have a high resin content and high flow characteristics. A suitable B-stage pre-preg sheet material is

| Manufacturer: | U.S. Polymeric Company |
|---|---|
| Material: | Number 116 Volan E-730-K |
| Properties: | Resin — 59% ± 3% |
| | Flow — 43% ± 3% |
| | Gel — 4 to 5 minutes at 340°F |
| | Cure — 30 to 40 minutes at 354°F and 250 p.s.i. |
| | Thickness 0.007" |

If rings 36 and 42 are made from this pre-preg material a platten temperature of 325°F ± 5°F is used for hot tacking. For a relatively small armature having 150 conductors of No. 27AWG size wire, a pressure of 300 p.s.i. for 6 seconds produces a good tack. The time and pressure should be increased as the number of armature conductors increases. For example, in an armature having 510 conductors of No. 27 AWG size wire a pressure of 600 p.s.i. for a period of 15 seconds was found to produce the best hot tack.

If disc 70 is made from the same pre-preg material a similar platten temperature of 325°F ± 5°F is used for hot tacking. A pressure of 400 p.s.i. for 8 seconds produces acceptable results.

For lamination, a gel cycle of approximately 7 ½ minutes at 340°F while maintaining contact pressure of about 5 p.s.i. followed by a cure cycle of approximately 37 minutes at 340°F and a pressure of 250 p.s.i. produces an acceptable laminate which is flat and balanced. For further details concerning the gel cyccle and cure cycle see copending application Ser. No. 680,983 filed Nov. 6, 1967 in the name of Rudolph J. Armstrong, Jr. and entitled *AN IMPROVED PROCESS OF PREPARING THERMOSETTING LAMINATES*.

With relatively slow curing resins such as specifically mentioned above, hot tacking operations followed by a laminating operation at the end of the process is preferable since the entire process, except for the laminating operation, can be performed in a sequence of relatively short on-line assembly operations. Where suitable fast curing resins can be used, however, the armature structure can be laminated at steps 2 and 7 (FIG. 1) instead of being hot tacked, and steps 10 and 11 can be eliminated.

DETAILED DESCRIPTION OF MOTOR

Figure 10:
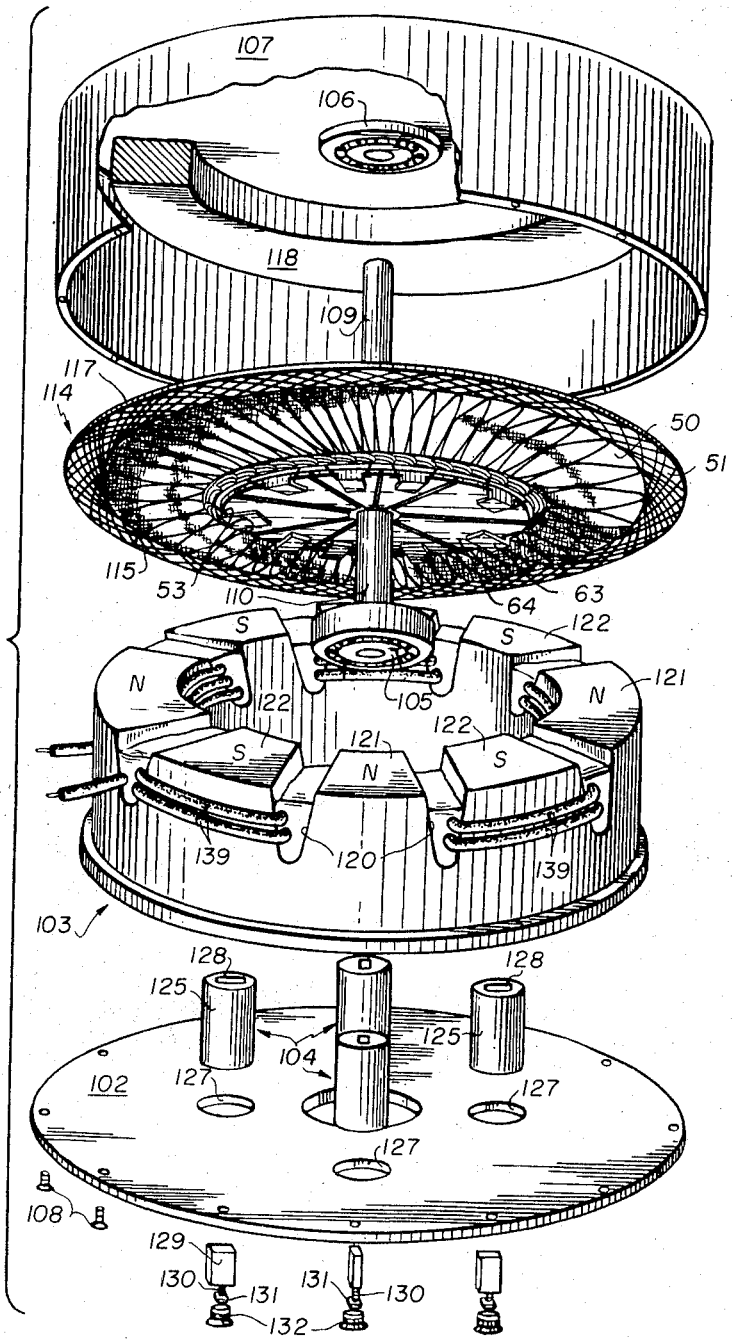
FIG. 10 is a perspective assembly illustration for the motor.

The disc type motor in accordance with this invention is shown in FIGS. 9 and 10. The motor is enclosed within a two-part housing 101 including a base plate 102. A stationary permanent magnet structure 103, brush holders 104 and one of the bearings 105 are mounted on the base plate. The other bearing 106 is mounted within a central opening in the cup-shaped member 107 forming the other part of the motor housing, member 107 being secured to the base plate at its periphery by means of screws 108.

The motor shaft 109 is journaled in bearings 105 and 106, and includes an intermediate section 110 of increased diameter. The increased diameter section is positioned between the bearings and prevents axial movement of the shaft. The motor armature is mounted on shaft 109 by means of hub 71 scured to the shaft by a press fit.

The motor illustrated in FIGS. 9 and 10 is an eight pole motor and therefore the permanent magnet structure 103 is divided into eight segments which provide the necessary pole faces. The permanent magnet structure is a unitary ring-shaped member provided with slots 120 which define individual bosses that form an annular array of the pole faces lying in a plane perpendicular to the axis of rotation. The magnetic structure is a cast or sintered unit fashioned from a nickel-aluminum-cobalt alloy such as Alnico. The structure is magnetized to provide pole faces of alternating magnetic polarities. A ring 118 of soft iron is secured to the rear of the housing by screws 119 to complete the magnetic path between adjacent pole faces. The space between ring 118 and the pole face surfaces is the working gap of the machine and must be sufficient to accommodate the armature and provide a working clearance. Permanent magnet structure 103 is secured to base plate 102.

The radially extending segments 50 of the armature winding lie within the working air gap adjacent the pole faces, this being the portion of the armature laminated between pre-preg rings 36 and 42. The thickness of this portion of the armature winding is maintained at a minimum. The thicker portions of the winding which include crossover connections 51 and 52 are located outside the air gap.

Disc 70 becomes part of the laminated structure within the air gap but also extends inwardly to couple the winding to the commutator 61 and hub 71 as can be seen best in FIG. 9. Disc 70 also serves as a dielectric between the commutator and the hub.

Brush holders 104 each include an insulated sleeve having a cylindrical body portion 125, the end of which extends through suitable openings 127. The brushes 129 are rectangular in cross section and extend from the brush holders through suitably dimensioned rectangular openings 128. The end of the brush holder opposite the rectangular opening is internally threaded and adapted to receive a flat head screw 132. When the screw is inserted, pressure is applied to the brush via a spring 130 and small pressure plate 131, so that the brush is maintained in engagement with commutator segments 116. The number of brushes and the placement relative to the pole faces varies in accordance with the armature winding and current carrying requirements.

Although only one illustrative embodiment of the process and apparatus has been described in detail, it should be obvious that there are numerous variations within the scope of the invention. The invention is more particularly defined in the appended claims.

We claim:

1. A method of producing wire wound disc armatures including the steps of laying down a first flat annular ring of resin impregnated sheet material, depositing insulated wire upon said annular ring to form a closed armature winding having generally radial conductor segments lying on said first ring and inner and outer crossover connections extending beyond the inner and outer peripheries, respecively, of said first ring, laying down a second flat annular ring of resin impregnated sheet material over said insulated wire and said first ring, and applying heat and pressure to said first and second rings thereby causing said resin therein to flow to provide a substantially flat laminated armature.

2. The method according to claim 1 wherein said resin impregnated sheet material is an epoxy impregnated glass cloth.

3. The method according to claim 1 wherein said insulated wire is deposited on to a winding form, sufficient heat and pressure is applied prior to removing said winding from said winding form to fix the winding configuration by hot tacking; and additional heat and pressure are applied after removal of said winding from said winding form to laminate said winding between said annular rings.

* * * * *